(12) United States Patent
Satoh (10) Patent No.: US 7,844,979 B2
(45) Date of Patent: Nov. 30, 2010

(54) DISC PLAYER

(75) Inventor: Katsuhisa Satoh, Tokyo (JP)

(73) Assignee: Clarion Co., Ltd., Bunkyo-ku, Tokyo (JP)

( * ) Notice: Subject to any disclaimer, the term of this patent is extended or adjusted under 35 U.S.C. 154(b) by 787 days.

(21) Appl. No.: 11/373,323

(22) Filed: Mar. 13, 2006

(65) Prior Publication Data

US 2006/0179444 A1 Aug. 10, 2006

Related U.S. Application Data (63) Continuation of application No. 10/031,399, filed on Jan. 18, 2002, now Pat. No. 7,076,790.

(30) Foreign Application Priority Data

May 22, 2000 (JP) .............................. 2000-149703

(51) Int. Cl.
G11B 17/04 (2006.01)
(52) U.S. Cl. ...................... 720/619; 720/617; 720/622
(58) Field of Classification Search ................ 720/604, 720/720, 601, 603, 647, 617, 619, 621, 624; 360/99.02, 99.06, 99.12, 131, 133; 369/291, 369/75.21
See application file for complete search history.

(56) References Cited

U.S. PATENT DOCUMENTS

| | | | |
|---|---|---|---|
| 4,979,160 A * | 12/1990 | Araki | 720/621 |
| 5,054,016 A | 10/1991 | D'Alayer et al. | |
| 5,208,802 A * | 5/1993 | Suzuki et al. | 720/720 |
| 5,592,350 A * | 1/1997 | Uehara et al. | 360/99.12 |
| 5,610,892 A * | 3/1997 | Choi | 720/631 |
| 5,737,305 A * | 4/1998 | Kayukawa | 720/604 |
| 5,815,344 A * | 9/1998 | Aoki | 360/99.06 |
| 5,831,790 A * | 11/1998 | Iftikar et al. | 360/99.12 |
| 5,986,981 A | 11/1999 | Takemasa et al. | |
| 6,002,556 A * | 12/1999 | Oishi | 360/133 |
| 6,028,832 A * | 2/2000 | Hojo et al. | 720/647 |

(Continued)

FOREIGN PATENT DOCUMENTS

EP 0 944 070 A1 9/1999

(Continued)

OTHER PUBLICATIONS

International Search Report dated Sep. 11, 2001, with partial English translation.
European Search Report dated Mar. 3, 2006.

*Primary Examiner*—William J Klimowicz
*Assistant Examiner*—Carlos E Garcia
(74) *Attorney, Agent, or Firm*—McGinn IP Law Group, PLLC (57) ABSTRACT

A disc player 10 is equipped with a positioning unit 14 that has step plate 54 and positions a disc 1, a clamper unit 15 that has a clamp plate 66 and carries out a clamp operation on the disc positioned by the positioning unit, a drive unit 16 that has a pickup and a turntable 19 on a drive plate 18, and rotates the disc clamped on the turntable by the clamper unit to take information from the disc by the pickup, wherein the positioning unit and the clamper unit are provided separately from each other, and movable vertically to the drive unit.

20 Claims, 9 Drawing Sheets

U.S. PATENT DOCUMENTS

| | | |
|---|---|---|
| 6,345,030 B1 | 2/2002 | Sakurai et al. |
| 6,414,929 B1 | 7/2002 | Fujiwara |
| 6,493,308 B2 | 12/2002 | Takamatsu et al. |
| 6,529,471 B1 * | 3/2003 | Lim et al. .................. 720/740 |
| 6,570,737 B1 * | 5/2003 | Ota ......................... 360/99.02 |
| RE38,290 E * | 10/2003 | Rose .......................... 360/131 |
| 6,646,973 B2 | 11/2003 | Kikuchi et al. |
| 6,735,161 B1 * | 5/2004 | Sato et al. ................... 720/621 |

FOREIGN PATENT DOCUMENTS

| | | |
|---|---|---|
| JP | 60-214472 | 10/1985 |
| JP | 02 042675 | 2/1990 |
| JP | 06 044660 | 2/1994 |
| JP | 2000-90531 | 3/2000 |

* cited by examiner

DISC PLAYER

The present application is a Continuation Application of U.S. patent application Ser. No. 10/031,399, filed on Jan. 18, 2002 now U.S. Pat. No. 7,076,790.

TECHNICAL FIELD

The present invention relates to a disc player that is mounted in a vehicle and reproduces information in a recording medium disc such as CD (compact disc) or the like.

There is known a conventional disc player such as a CD player or the like which is mounted in a vehicle and designed such that a clamper for guiding and positioning a disc to a predetermined position and clamping the disc onto a turntable is equipped to a drive plate on which a pickup and the turntable are disposed so that the clamper can carry out the above operation by rotation of a clamp arm.

However, in such a disc player, the rotation amount (rotation angle) of the clamp arm rotating within a range in the height direction of the disc player must be increased to move the disc in the vertical direction to the drive plate by a predetermined amount. Therefore, it has been difficult to reduce the thickness of the disc player.

An object of the present invention has been implemented in consideration of the above circumstances, and is to provide a disc player that can be designed to be small in thickness.

SUMMARY OF THE INVENTION

According to the present invention, a disc player comprises a positioning unit for positioning a disc, a clamper unit for performing a clamp operation on the disc positioned by the positioning unit, and a drive unit that has a pickup and a turntable and rotates the disc clamped on the turntable by the clamp unit to take out information from the disc by the pickup, wherein the positioning unit and the clamper unit are provided separately from each other and movable substantially vertically to the drive unit.

Further, in the above invention, a step plate equipped to the positioning unit and a clamp plate equipped to the clamper unit are engaged with a cam groove of a cam plate movable in parallel to a drive plate equipped to the drive unit, and movable vertically to the drive plate by movement of the cam plate.

In the above invention, the step plate and the clamp plate are moved synchronously and vertically to the drive plate by the movement of the cam plate.

In the above invention, fit members which are provided to the step plate and the clamp plate and engaged with said cam grooves of said cam plate are fit pawls that are integrally formed by bending and erecting.

In the above invention, the fit pawls of the step plate and the clamp plate are integrally formed by bending and erecting in a forming process thereof.

In the above invention, the positioning unit is designed so as to position plural kinds of discs that are different in size.

In the above invention, the positioning unit has a step plate, a G plate which is freely rotatably provided to the step plate and has, at one end thereof, a disc stopper on which a disc can be supported, and a sensor arm having, at one end thereof, an arm rod that can be fitted to the disc, the fitting positions of the other ends of the G plate and the sensor arm being changeable in accordance with plural discs different in diameter so that the discs can be positioned.

In the above invention, the moving amounts of the positioning unit and the clamper unit are set to different values.

In the above invention, the moving amount of the clamper unit is set to a value larger than that of the positioning unit.

In the above invention, the moving amount of the positioning unit is set so that a vibration-isolation stroke can be kept, and the moving amount of the clamper unit is set so that the vibration-isolation stroke can be kept and the clearance between the clamper unit and the clamper ring for clamping the disc onto the turntable can be kept.

According to the present invention, the step plate and the clamp plate are designed so as to be movable vertically to the drive plate, so that the moving amounts of the step plate and the clamp plate can be more reduced as compared with a case where the clamper for clamping the disc onto the turntable is moved relatively to the turntable by the rotation of the clamp arm and a case where the step plate and the clamp plate are integrally rotated, and thus the disc player can be designed in a thin structure.

According to the present invention, the step plate and the clamp plate are separately provided, and thus the moving amounts of both the plates can be set to different values. That is, the moving amount of the step plate can be set to such a value that a vibration-isolation stroke can be kept, and the moving amount of the clamp plate can be set to such a value that the vibration-isolation can be kept, and also the clearance between the clamp plate and the clamper ring can be kept.

Further, according to the present invention, the fit members which are provided to the step plate and the clamp plate and engageable with the cam grooves of the cam plate are fitting pawls which are integrally formed by bending and erecting them. Therefore, as compared with the construction that the fitting members comprise caulking pins, the structure of the step plate and the clamp plate can be more simplified, and thus the structure of the disc player can be more simplified.

PREFERRED EMBODIMENTS OF THE INVENTION

Preferred embodiments according to the present invention will be described hereunder with reference to the accompanying drawings.

Figure 1A:
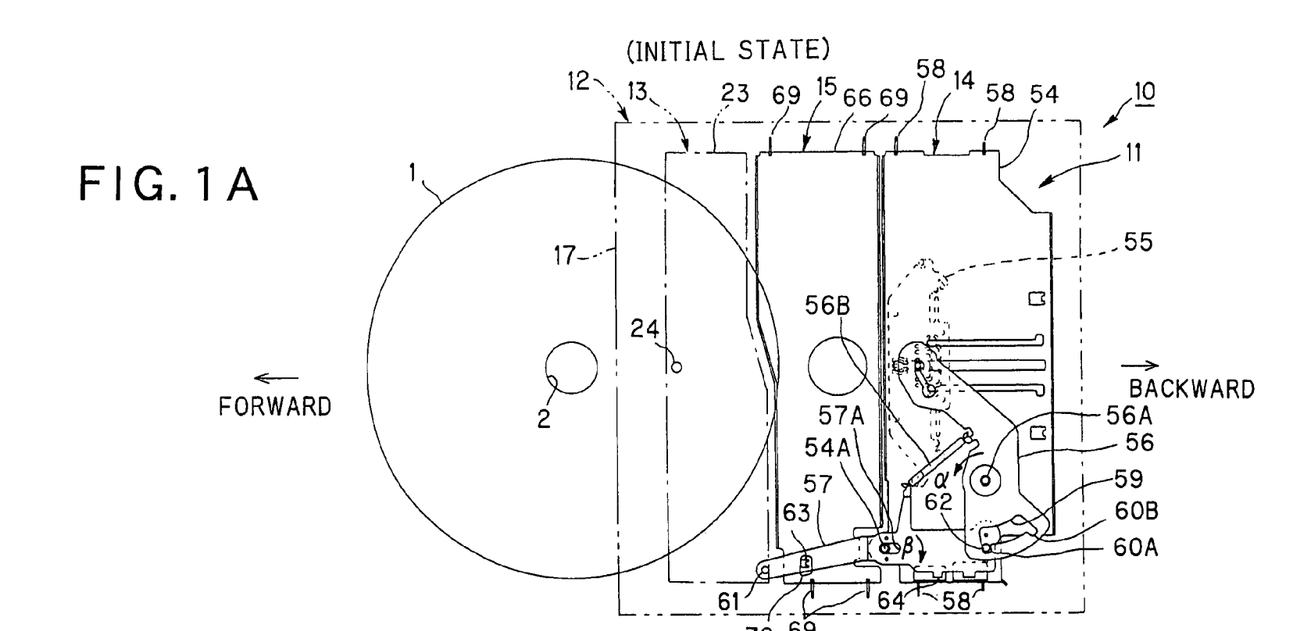
FIG. 1A shows an embodiment of a disc player according to the present invention, and is a plan view showing the initial state of the disc player when a disc stopper is located at an initial position.

A disc player shown in FIG. 1A is used to reproduce information recorded on a recording medium disc 1 such as a CD (compact disc), DVD (digital versatile disc) or the like, and it comprises a player main body 11 and a chassis unit 12. Further, as shown in FIG. 5A, the player main body 11 comprises a loading unit 13, a positioning unit 14, a clamper unit 15 and a drive unit 16.

The chassis unit 12 is equipped with a vibration-isolating structure having a clamper and a spring (not shown) on a chassis 17 thereof, and the player main body 11 is supported through the vibration-isolating structure by the chassis 17 so as to be floated.

Figure 5A:
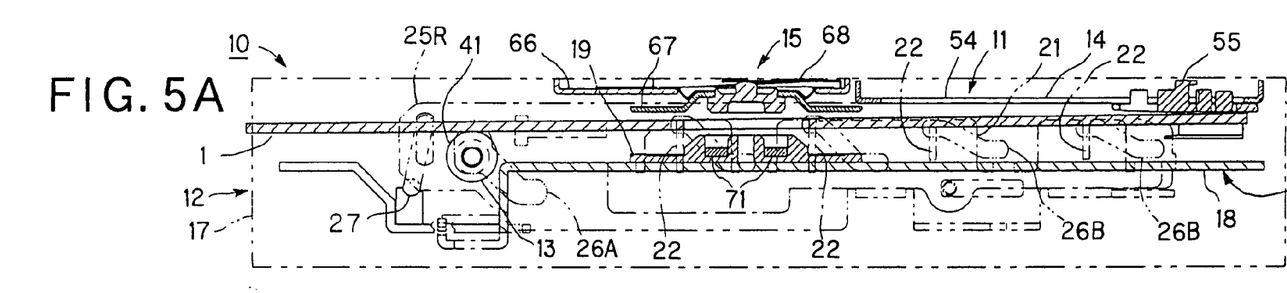
FIGS. 5A, 5B and 5C are cross-sectional views of the step plate and the clamp plate which are taken along the center lines of FIGS. 2A, 3A, 4A.
Figure 6:
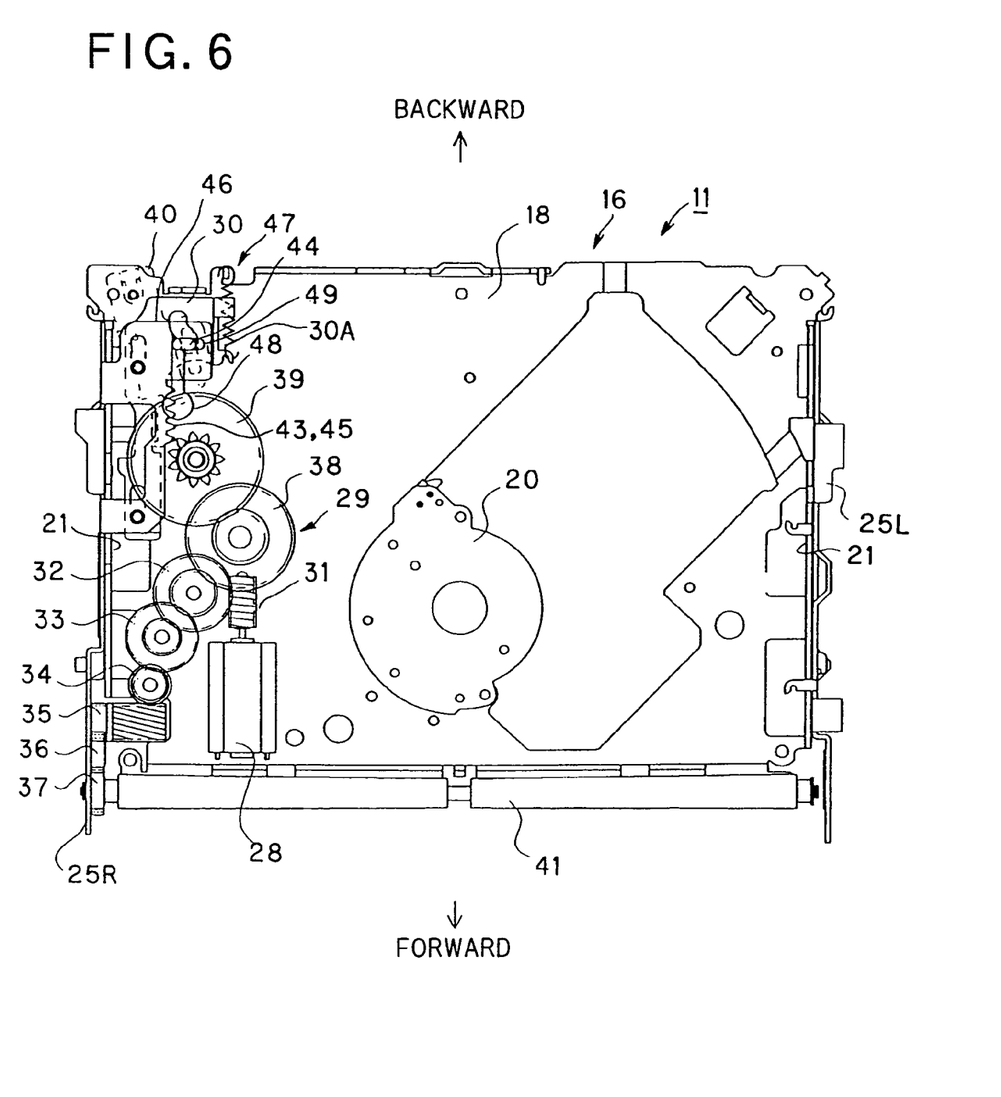
FIG. 6 is a back view showing the player main body of the disc player of FIG. 1A.

As shown in FIGS. 5A and 6, in a drive unit 16 of the player main body 11, a turntable 19 is disposed at the center on the surface of a drive plate 18 while a spindle motor 20 is disposed at the center of the back surface, and the spindle motor 20 rotates the turntable 19. Further, a pickup (not shown) is mounted on the drive plate 18, and takes out information from the disc 1 which is clamped on the turntable as described later and rotated.

Further, side walls 21 are integrally formed at both the right and left sides of the drive unit 16, and longitudinal grooves 22 (FIG. 5A) extending in the up-and-down direction (in the vertical direction to the drive plate 18) are formed on the side walls 21. An upper plate 23 (FIG. 1A) is fixedly disposed at the front portion of the drive unit 16, and a disc sensor 24 for detecting the disc inserted by a user is secured to the upper plate 23.

As shown in FIGS. 5A to 5C and 6, an R cam plate 25R and an L cam plate 25L are disposed on both the side walls 21 of the drive unit 16 so as to be movable in parallel to the drive plate 18 in the frontward and backward directions of the disc player 10. As shown in FIGS. 5A to 5C and FIGS. 8A and 8B, cam grooves 26A, 26B and 26C are obliquely formed in the R cam plate 25R and the L cam plate 25L.

The R cam plate 25R and the L cam plate 25L are linked to each other by a cranked crank shaft 27 and a loading plate (described later). The forward and backward movement of the R cam plate 25R is transferred to the L cam plate 25L by the crank shaft 27, and the L cam plate 25L and the R cam plate 25R are movable in synchronism with each other.

As shown in FIG. 6, a loading motor 28, a gar wheel sequence 29 and a trigger rack 30 are disposed at the R cam plate 25R side on the back surface of the drive plate 18. Further, an S arm stopper 40 is disposed at the position corresponding to the trigger rack 30 on the surface of the drive plate 18.

Figure 1B:
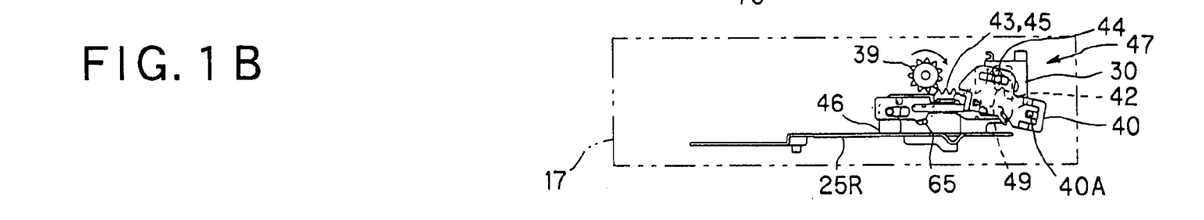
FIG. 1B is a plan view showing a trigger rack, an S arm stopper, etc. of FIG. 1A.

The trigger rack 30 is disposed so as to be movable in the forward and backward directions of the disc player 10, and it is urged backwardly at all times by a tensile coil spring suspended between the trigger rack 30 and the drive plate 18. As shown in FIGS. 9A to 9D, the trigger rack 30 has a trigger groove 42 oblique to the above moving directions and a rack 43. A pin 40A (FIG. 1B) implanted in the drive unit 16 is inserted in the elongated hole of the S arm stopper 40, so that the S arm stopper 40 is movable in the forward and backward directions of the disc player 10 and also rotatable. Further, the S arm stopper 40 is equipped with a lock pin 44.

The gear wheel sequence shown in FIG. 6 comprises a first gear 31 coupled to the shaft of the loading motor 28, a second gear 32 engaged with the first gear 31, a third gear 33, a fourth gear 34, a fifth gear 35, a sixth gear 36 and a seventh gear 37 which are mutually engaged with one another, and an idle gear 38 and a final gear 39 which are mutually engaged with each other. The second gear 32 is engaged with the third gear 33 and the idle gear 38.

The seventh gear 37 is coupled to a loading roller 41 as described later. The final gear 39 is engageable with the rack 43 of the trigger rack 30 and the rack 45 of the R cam plate 25R as shown in FIGS. 6 and 9A to 9D. The rack 45 is formed in a driving piece 46 extending to the back surface side of the drive plate 18 in the R cam plate 25R.

The rack 45 of the R cam plate 25R is prevented from being unnecessarily engaged with the final gear 39 by the lock operation of the lock mechanism 47.

Figure 9A:
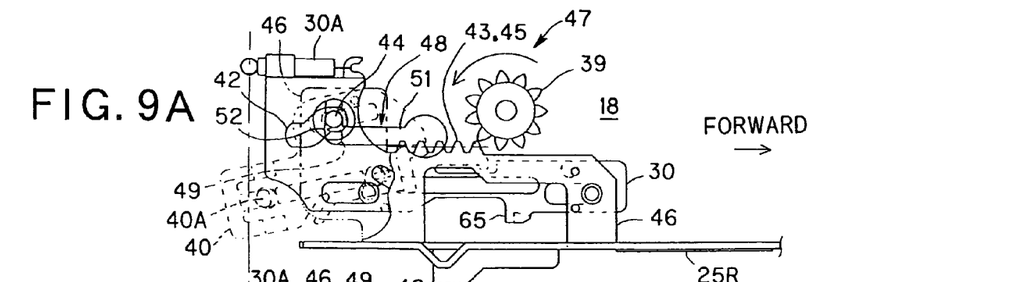
FIG. 9A to 9D are diagrams showing a lock releasing operation in a lock mechanism of the R cam plate of FIG. 6.

That is, as shown in FIG. 9A, the lock mechanism 47 has a key-shaped hole 48 formed in the drive plate 18, an elongated hole formed in the driving piece 46 of the R cam plate 25R, the trigger groove 42 of the trigger rack 30 described above, and a lock pin 44 of the S arm stopper 40. The key-shaped hole 48 has a first hole 51 extending in the forward and backward directions of the drive plate 18, and a second hole 52 perpendicular to the first hole 51. The elongated hole 49 extends in parallel to the second hole 52. The lock pin 44 is fitted in the key-shaped hole 48, the elongated hole 49 and the trigger groove 42.

Under the state that the disc 1 is not inserted in the play main body 11 of the disc player 10, the lock pin 44 is fitted in the second hole 52 of the key-shaped hole as shown in FIG. 9A, so that the R cam plate 25R is prevented from moving in the forward and backward directions of the disc player 10. Accordingly, even when a careless shock such as falling impact or the like is applied to the player main body 11, the final gear 39 is prevented from being engaged with the rack 45 of the R cam plate 25R.

The release of the lock operation of the lock mechanism 47 described above is carried out as follows.

Figure 9B:
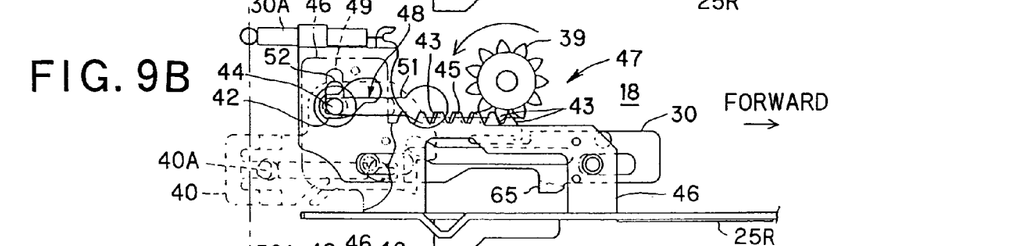
Figure 9C:
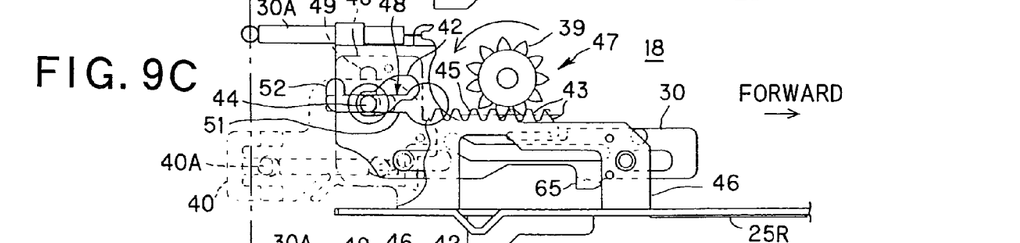
Figure 9D:
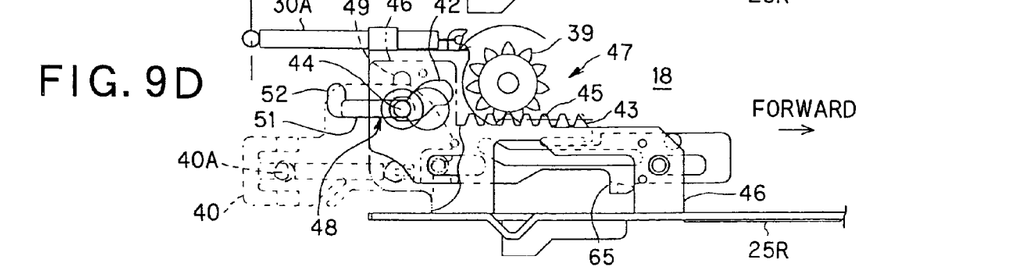

That is, when the trigger rack 30 is pressed in the forward direction of the disc player 10 by a sensor arm 57 described later and forwardly moved against the urging force of the tensile coil spring 30A, the rack 43 of the trigger rack 30 is engaged with the final gear 39, and the trigger rack 30 is further moved in the forward direction of the disc player 10 by the driving force of the loading motor 28 as shown in FIG. 9B. At this time, the trigger groove 42 of the trigger rack 30 moves the lock pin 44 from the second hole 52 of the key-shaped hole 48 to the first hole 51, whereby the lock operation of the lock mechanism 47 is released. Thereafter, when the trigger rack 30 further presses the R cam plate 25R through the lock pin 44, the rack 45 of the R cam plate 25R is engaged with the final gear 39 as shown in FIG. 9C and the R cam plate 25R is moved in the forward direction of the disc player 10 (FIG. 9D). At this time, the lock pin 44 is moved in the first hole 51 of the key-shaped hole 48.

As shown in FIGS. 5A to 5C and 6, the loading unit 13 comprises the loading roller 41 and a loading plate (not shown). The loading plate is rotatably supported on the upper plate 23 (FIG. 1A), and the shaft of the loading roller 41 is supported by the loading plate so as to be freely rotatable. The shaft of the loading roller 41 is fitted in the cam groove 26A of the R cam plate 25R at one end thereof, and fitted in the elongated hole formed in the side wall 21 of the drive plate 18 at the other end thereof.

The loading plate presses the loading roller 41 against the disc loader 41 by spring force. The driving force of the loading motor of FIG. 6 is transferred to the loading roller 41 through the first gear 31 to the seventh gear 37 of the gear wheel sequence. Accordingly, when the disc sensor 24 detects the disc 1 and the loading motor 28 is actuated, the loading roller 41 is rotated to draw and feed the disc 1 into the player main body 11.

When the R cam plate 25R and the L cam plate 25L are moved in the forward direction of the disc player 10, the shaft of the loading roller 41 is downwardly moved along the cam groove 26A of the R cam plate 25R, the loading roller 41 is separated from the disc 1 and the drawing/feeding operation of the disc 1 is stopped. At this time, the loading plate is rotated around a predetermined rotatably-supporting point (not shown), and the fitting between the loading plate and a projection (not shown) of the chassis 17 is released, so that the player main body 11 is supported in the floating style by the chassis 17.

Figure 5B:
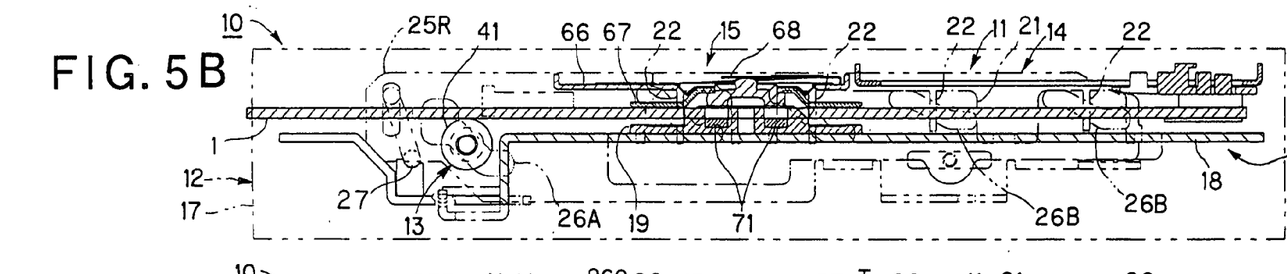
Figure 5C:
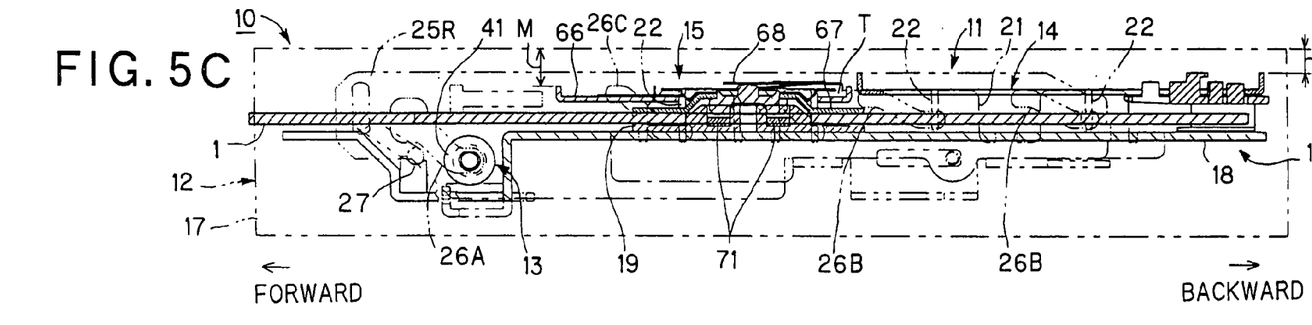

As shown in FIGS. 1A and 5A, the positioning unit 14 has a step plate 54, a disc stopper 55, a G plate and a sensor arm 57, and it carries out the positioning operation of the disc 1 so that the center of the center hole 2 of a large-diameter or small-diameter disc 1 (that is, the center of the disc 1) is coincident with the center of the turntable 19 (FIGS. 5A to 5C).

Figure 7:
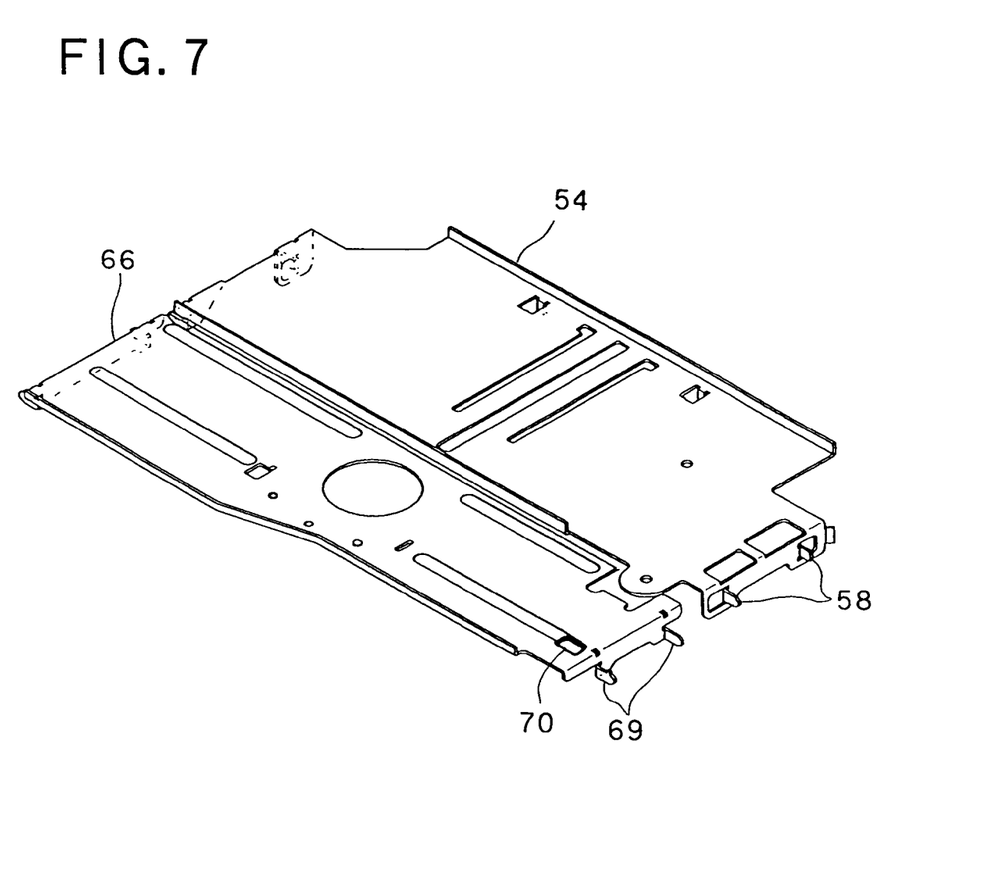
FIG. 7 is a perspective view showing the step plate and the clamp plate of FIG. 1A.
Figures 8A, 8B:
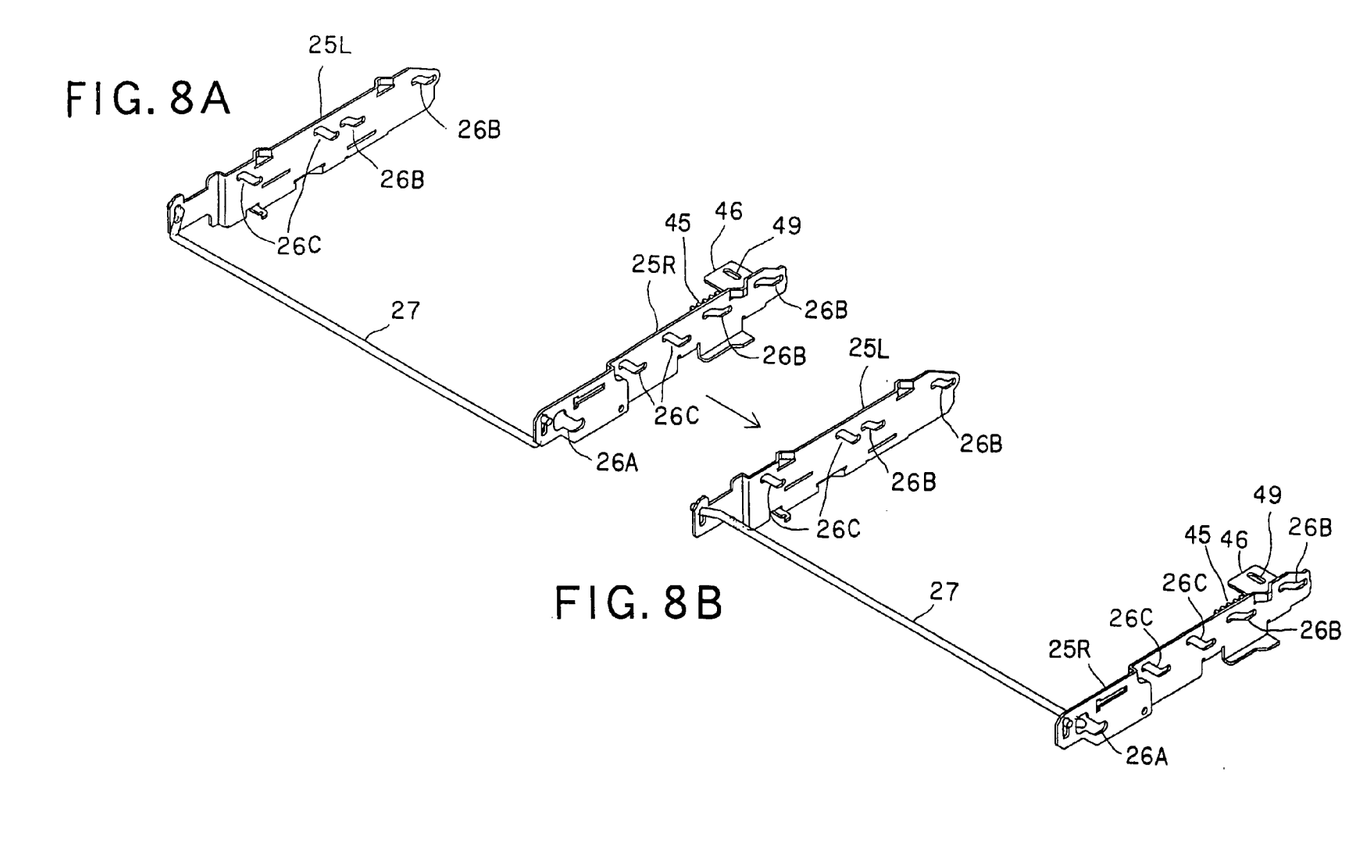
FIGS. 8A and 8B are perspective views showing an R cam plate and an L cam plate of FIGS. 1B to 5A.

Fit pawls 58 are formed at both the right and left sides of the disc player 10 on the step plate 54. As shown in FIG. 7, the fit pawls 58 are formed by bending and erecting them in the process of forming the step plate 54. As shown in FIGS. 5A to 5C, these fit pawls 58 are fitted in the longitudinal grooves 22 formed in the side wall 21 ƒ the drive plate 18 and the cam grooves 26B of the R cam plate 25 and the L cam plate 25L. Accordingly, when the R cam plate 25R and the L cam plate 25L are moved in the forward and backward directions of the disc player 10, the fit pawls 58 are movable in the vertical direction to the drive plate 18 along the longitudinal grooves 22 of the drive plate 18, that is, movable upwardly and downwardly.

The downward movement of the step plate 54 enables a vibration-isolation stroke L to be kept between the positioning unit 14 and the chassis 17. Further, the upward movement of the step plate 54 enables the disc 1 to be moved over the turntable 19 of the drive unit 16 and pulled into the player main body 11.

As shown in FIG. 5A, the disc stopper 55 is formed to be U-shaped in section to accommodate the disc 1 pulled into the player main body 11. Further, as shown in FIG. 1A, the disc stopper 55 is fitted to the step plate 54 so as to be movable in the forward and backward directions of the disc player 10, and the disc 1 pulled and fed into the player main body 11 by the loading roller 41 is positioned to a predetermined position by the disc stopper 55.

By the mechanism of the G plate 56 and the sensor arm 57 described later, the disc stopper 55 is positioned from the initial position shown in FIG. 1A to a positioning position shown in FIGS. 2A and 3A at which the center of the center hole 2 of the disc 1 and the center of the turntable 19 are coincident with each other, and a retracting position shown in FIG. 4A at which the stopper is separated from the disc 1 clamped and chucked onto the turntable 19.

The G plate 56 is rotatably supported by a pin 56A implanted on the step plate 54, and the disc stopper 55 is secured to one end portion of the G plate 56. An opening 59 is formed at the other end portion of the G plate 56, and an A hole 60A and a B hole 60B are formed in the opening 59.

The sensor arm 57 is rotatably supported on the step plate 54A so as to be slightly movable in the forward and backward directions of the disc player 10. That is, the pin 54A implanted on the step plate 54 is inserted in an elongated hole 57A formed in the sensor arm 57. An arm rod 61 is implanted at the tip portion of the sensor arm 57, and a boss 62 is formed at the other end portion. The boss 62 is positioned in the opening 59 of the plate 56. A stop pawl 63 which is engageably fitted in a stop groove 70 of a clamp plate described later is formed in the neighborhood of the arm rod 61 of the sensor arm 57.

The G plate 56 and the sensor arm 57 are urged in a counterclockwise direction a and in a clockwise direction 8 respectively by a tensile coil spring 56B suspended therebetween.

When a small-diameter disc 1 (for example, 8 cm CD) is pulled into the player main body 11, the arm rod 61 may abut against the disc 1 in an initial stage in accordance with an insertion position of the disc 1. However, even when the arm rod 61 abuts against the disc 1, the abutting of the disc 1 is released in the disc pull-in/centering process. Accordingly, in this case, the stop pawl 63 is engagedly fitted in the stop groove 70 under the state that the boss 62 of the sensor arm 57 is fitted in the A hole 60A of the G plate 56, whereby the rotation of the G plate 56 is prevented and the disc stopper 55 is positioned to the positioning position of the small-diameter disc 1.

When a large-diameter disc 1 (for example, 12 cm CD) is pulled into the player main body 11, the disc 1 abuts against the arm rod 61 of the sensor arm 57, and the sensor arm 57 is outwardly rotated through the pull-in operation of the disc 1, whereby the engagement between the boss 62 of the sensor arm 57 and the A hole 60A of the G plate 56 is released. The disc 1 presses the disc stopper 55 in the backward direction of the disc player 10 against the tensile force of the tensile coil spring 56B, whereby the G plate 56 is rotated and the boss 62 of the sensor arm 57 moves in the backward direction of the disc player 10 in the opening 59 of the G plate 56.

When the disc 1 moves in the backward direction of the disc player 10 as described above, the disc 1 is separated from the arm rod 61 of the sensor arm 57, whereby the boss 62 of the sensor arm 57 is fitted into the B hole 60B of the G plate 56 by the tensile force of the tensile coil spring 56B. When the disc 1 is further moved in the backward direction of the disc player 10, the G plate 56 is minutely rotated against the tensile force of the tensile coil spring 56B, and the rotating force at this time moves the sensor arm 57 in the forward direction of the disc player 10 through the boss 62. At the stage that the stop pawl 63 of the sensor arm 57 is hooked to the stop groove 70 of the clamp plate 66 during the movement of the sensor arm 57, the rotation of the G plate 56 is stopped, and the disc stopper 55 is positioned to the position at which the large-diameter disc 1 is positioned.

Actually, when the G plate 56 is further minutely rotated and the sensor arm 57 is minutely moved in the forward direction of the disc player 10 by the pull-in operation of the disc 1 from the stage that the boss 62 of the sensor arm 57 is fitted into the B hole 60B, a sensor arm press pawl 64 of the sensor arm 57 presses a trigger rack press-receiving portion 65 of the trigger rack 30 to minutely move the trigger rack 30 in the forward direction of the disc player 10, which makes it an occasion for the rack 43 of the trigger rack 30 to engage with the final gear 39.

As shown in FIGS. 1A and 5A to 5C, the clamper unit 15 has a clamp plate 66, a clamp ring 67 and a clamp spring 68, and clamps the disc positioned by the positioning unit 14 onto the turntable 19 of the drive unit 16.

As shown in FIG. 7, the clamp plate 66 is separated from the step plate 54 of the positioning unit 14, and fit pawls 69 are disposed at both the right and left sides of the disc player 10 on the clamp plate 66 as in the case of the step plate 54. The fit pawls 69 are formed by bending and erecting them when the clamp plate 66 is formed from a metal plate. As shown in FIGS. 5A to 5C, the fit pawls 69 are fitted in the longitudinal grooves 22 in the side wall 21 of the drive plate 18 and the cam grooves 26C of the R cam plate 25R and the L cam plate 25L (see FIGS. 8A and 8B). Accordingly, when the R cam plate 25 and the L cam plate 25L are moved in the forward and backward directions of the disc player 10, the fit pawls 69 are movable in the vertical direction to the drive plate 18 along the longitudinal grooves 22 of the drive plate 18, that is, movable upwardly and downwardly.

The upward and downward movement of the clamp plate 66 is carried out in synchronism with the upward and downward movement of the step plate 54 of the positioning unit 14, however, the stroke thereof is set to a stroke M larger than the upward/downward movement stroke of the step plate 54 (that is, the vibration-isolation stroke L). For example, the upward/downward movement stroke of the step plate 54 is set to 2.5 mm, and the upward/downward movement stroke of the clamp plate 66 is set to 4.5 mm.

The stroke M of the clamp plate 66 is set on the basis of the following standard. That is, the disc 1 can be moved over the turntable 19 of the drive unit 16 and pulled into the drive unit 16 at the uppermost position of the clamp plate 66 (FIG. 5A). Further, the vibration-isolation stroke can be sufficiently kept between the clamper unit 15 and the chassis 17 at the lowermost position of the clamp plate 66 (FIG. 5C), and when the clamp ring 67 clamps the disc 1 on the turntable 19, a clearance T is set between the clamp ring 67 and the clamp plate 66.

The clamp ring 67 is disposed so as to be freely rotatable relatively to the clamp plate 66, and pressed against the clamp plate 66 by the spring force of the clamp spring 68. However, when the clamp plate 66 is downwardly moved to the lowermost position and clamps the disc 1 onto the turntable 19, it is separated from the clamp plate 66 and the clearance T is provided as described above. At the time when the disc 1 is clamped by the clamping ring 67, the spring force of the clamp spring 68 and the attractive force of a magnet 71 installed in the turntable 19 act on the clamp ring 67, and the disc 1 is clamped onto the turntable 19 by these forces.

Next, the operation of the disc player 10 thus constructed until the recording/reproducing operation is carried out will be described in the following items (1) to (4).

(1) As shown in FIG. 1A, when the disc 1 is inserted and the disc sensor 24 detects the disc 1, the loading motor 28 is actuated to rotate the loading roller 41, and the disc 1 is pulled and fed into the player main body 11. At this time, the disc stopper 55 is located at the initial position.

(2) The disc 1 pulled into the player main body 11 abuts against the disc stopper 55 and moves horizontally in the forward and backward directions. At this time, when the disc 1 is a large-diameter 12 cm CD, the sensor arm 57 is rotated, and the boss 62 of the sensor arm 57 is detached from the A hole 60A of the G plate 56, and the disc stopper 55 is movable to the positioning position for the 12 cm CD.

Figure 2A:
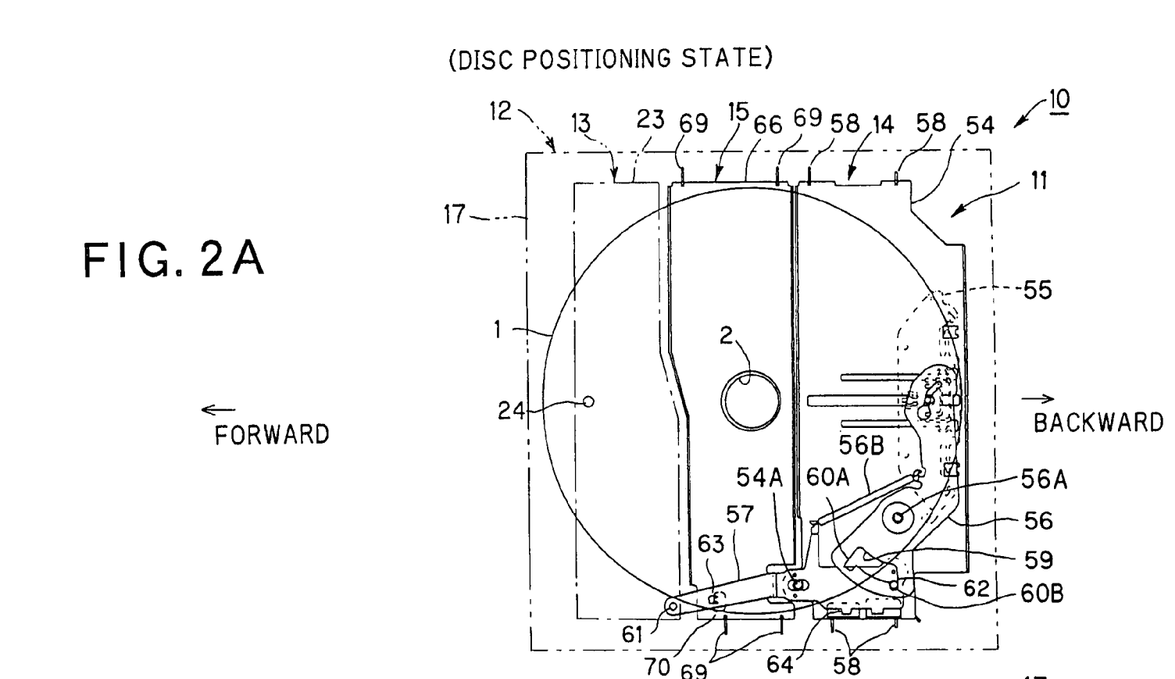
FIG. 2A is a plan view showing a disc positioning state of the disc player when the disc stopper is located at a disc positioning position in the disc player of FIG. 1A.

As shown in FIG. 2A, when the disc stopper 55 is moved to the positioning position for the 12 cm CD, the disc 1 is separated from the arm rod 61 of the sensor arm 57, and the sensor arm 57 is rotated in the clockwise direction β by the tensile force of the spring 56B, and the boss 62 of the sensor arm 57 is fitted into the B hole 60B of the G plate 56. When the disc 1 is further pulled in by the loading roller 41, the sensor arm 57 is horizontally moved in the forward direction of the disc player 10 until the stop pawl 63 of the sensor arm 57 is engagedly fitted in the stop groove 70 of the clamp plate 66. At this time, the disc stopper 55 is positioned to the positioning position.

Figure 2B:
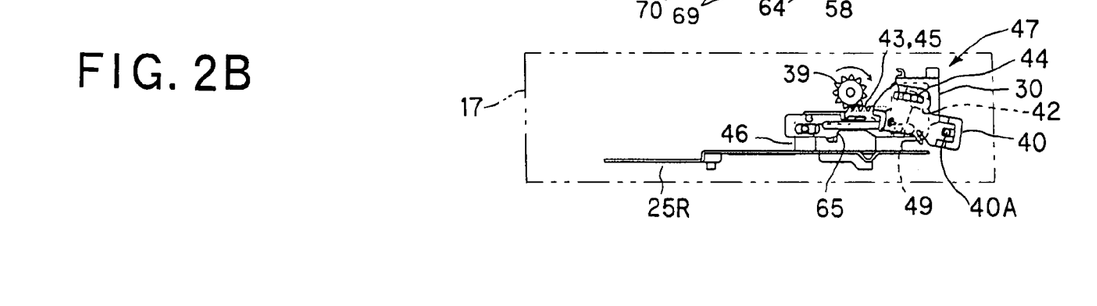
FIG. 2B is a plan view showing a trigger rack, an S arm stopper, etc. of FIG. 2A.

(3) As shown in FIG. 9A, the sensor arm 57 is moved forwardly as described above, whereby the sensor arm press pawl 64 of the sensor arm 57 (FIG. 2A) presses the trigger rack press-receiving portion 65 of the trigger rack 30 (FIG. 2B), and the trigger rack 30 is forwardly moved against the urging force of the tensile coil spring 30A, so that the rack 43 of the trigger rack 30 is engaged with the final gear 39.

Figure 3A:
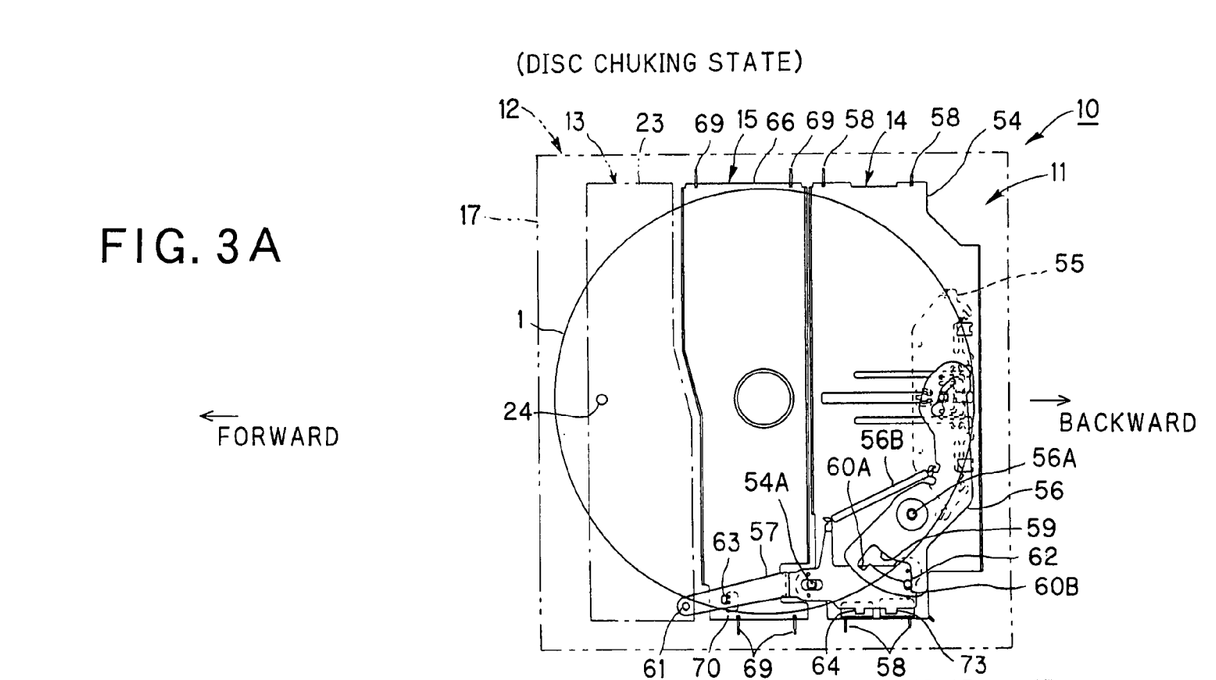
FIG. 3A is a plan view showing a disc chucking state of the disc player when the disc stopper is located at the disc positioning position in the disc player of FIG. 1A.
Figure 3B:
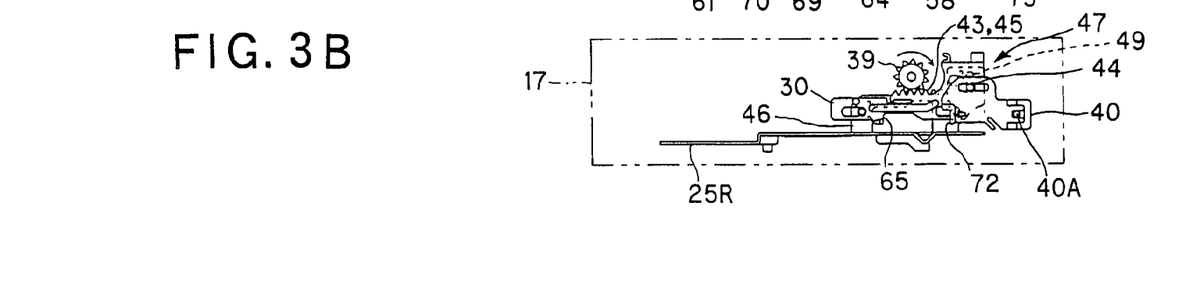
FIG. 3B is a plan view showing a trigger rack, an S arm stopper, etc. of FIG. 3A.

As shown in FIGS. 3A and 3B and FIG. 9B, when the rack 43 of the trigger rack 30 and the final gear 39 are engaged with each other, the trigger rack 30 is further horizontally moved in the forward direction of the disc player 10 with the assistance of the driving force of the loading motor 28, and the lock pin 44 of the S arm stopper is separated from the second hole 52 of the key-shaped hole 48 to release the lock operation of the lock mechanism 47. At this time, the S arm stopper 40 is rotated and enters the locus of the moved sensor arm 57 to prevent the sensor arm 57 from returning.

As shown in FIG. 9C, when the trigger rack 30 goes ahead and the rack 43 of the trigger rack 30 and the rack 45 of the R cam plate 25R are coincident in phase with each other, the trigger groove 42 of the trigger rack 30 further presses the driving piece 66 through the lock pin 44 and the elongated hole 49, and the rack 45 is engaged with the final gear 39 while the rack 43 and the rack 45 are coincident in phase with each other, so that the R cam plate 25R is horizontally moved in the forward direction of the disc player 10 together with the trigger rack 30. The horizontal movement of the R cam plate 25R is transferred to the L cam plate 25L by the clamp shaft 27 and the loading plate shown in FIGS. 5A to 5C and FIGS. 8A and 8B, and the R cam plate 25R and the L cam plate 25L are horizontally moved in synchronism with each other.

As shown in FIG. 5B, when the R cam plate 25R and the L cam plate 25L are moved in the forward direction of the disc player 10 the stop plate 54 and the clamp plate 66 are downwardly moved by the action of the cam grooves 26B and 26C of the R cam plate 25R and the L cam plate 25L. Likewise, a loading arm (not shown) is rotated by the action of the cam groove 26A, and the loading roller 41 is separated from the disc 1.

As shown in FIG. 5C, when the step plate 54 and the clamp plate 66 are downwardly moved to the lowermost position, the clamp ring 67 clamps the disc 1 onto the turntable 19 by the urging force of the clamp spring 68 and the attractive force of the magnet 71. AS described above, the disc stopper 55 is also positioned to the positioning position when the clamp ring 67 clamps the disc 1 onto the turntable 19.

(4) When the step plate 54 and the clamp plate 66 are downwardly moved to the lowermost position, the engagement between the stop pawl of the sensor arm 57 and the stop groove 70 of the clamp plate 66 shown in FIG. 3A is released.

Figure 4A:
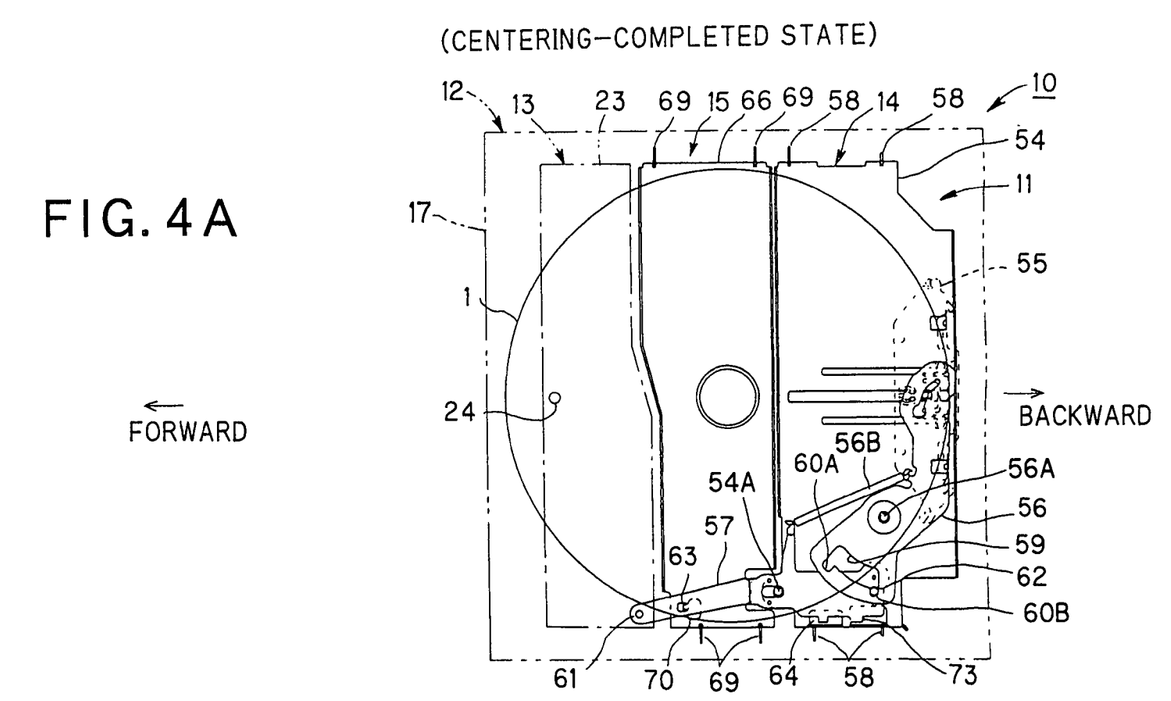
FIG. 4A is a plan view showing a centering-completed state of the disc player when the disc stopper is located at a retracting position in the disc player of FIG. 1A.

As shown in FIGS. 4A and 9D, the rotating force of the loading motor 28 is transferred to the R cam plate 25R through the final gear 39 and the rack 45 of the R cam plate 25R to move the R cam plate 25R and the L cam plate 25L in the forward direction of the disc player 10. The lock pin 44 presses the S arm stopper 40 in the neighborhood of the front-limit position of the R cam plate 25R, and moves the S arm stopper in the forward direction of the disc player 10.

Figure 4B:
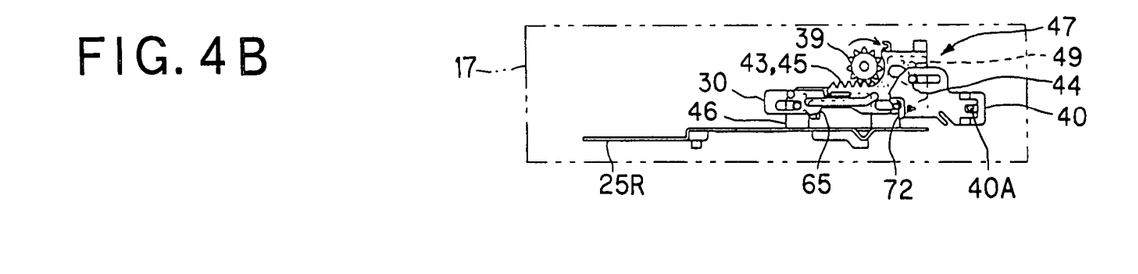
FIG. 4B is a plan view showing a trigger rack, an S arm stopper, etc. of FIG. 4A.

Accordingly, the S arm stopper press portion 72 of the S arm stopper 40 shown in FIG. 4B presses the sensor arm press-receiving portion 73 of the sensor arm 57 in the forward direction of the disc player 10. At this time, the stop pawl 63 of the sensor arm 57 is detached from the stop groove 70 of the clamp plate 66, so that the sensor arm 57 is minutely moved in the forward direction of the disc player 10 to rotate the G plate 56, and the disc stopper 55 is forcedly separated from the disc 1. As a result, the disc 1 is rotatable without coming into contact with the disc stopper 55.

In the item (2) of the operation of the disc player 1 described above, when the disc 1 is a small-diameter 8 cm-CD, the boss 62 of the sensor arm 57 is engagedly fitted and kept in the A hole 60A of the G plate 56. Under this state, the small-diameter disc 1 is pulled in by the loading roller 41, and the sensor arm 57 is horizontally moved in the forward direction of the disc player 10 until the stop pawl 63 of the sensor arm 57 is engagedly fitted in the stop groove 70 of the clamp plate 66, whereby the disc stopper 55 is located at the positioning position. The subsequent operation is the same as the items (3) and (4) of the operation.

According to the above-described embodiment, the following effects (1) to (3) are achieved.

(1) Since the step plate 54 and the clamp plate 66 are designed so as to be movable vertically to the drive plate 18 (downwardly and upwardly movable), the moving amount of the step plate 54 and the clamp plate 66 can be reduced less than when the clamper for clamping the disc onto the turntable is moved relatively to the turntable by the rotation of the clamp arm, or when the step plate 54 and the clamp plate 66 are integrally rotated, so that the disc player 10 can be designed in a thin structure.

(2) Since the step plate 54 and the clamp plate 66 are separately provided from each other, the moving amounts of the step plate 54 and the clamp plate 66 can be set to different values. That is, the step plate 54 can be set to such a moving amount that the vibration-isolation stroke L can be kept, and the clamp plate 66 can keep the vibration-isolation stroke L, and also can be set to such a moving amount that the clearance between the clamp plate 66 and the clamp ring 67 can be kept.

(3) The fit members which are provided to the step plate 54 and the clamp plate 66 and can be engageably fitted into the cam grooves 26 of the R cam plate 25R and the L cam plate 25L are the fit pawls 58, 69 which are integrally formed by bending and erecting them in the process of forming the clamp plate 66, so that the construction of the step plate 54 and the clamp plate 66 can be more simplified as compared with the case where the fit members are constructed by caulking pins, and thus the construction of the disc player 10 can be more simplified.

INDUSTRIAL UTILITY

As described above, according to the present invention, the positioning unit for positioning the disc and the clamp unit for performing the clamp operation on the disc positioned by the positioning unit are separately provided, so that the present invention can be applied to not only a reproduction-only disc player, but also a disc player which can record and reproduce information.

What is claimed is:

1. A disc player, comprising:
    means for positioning one disc of a plurality of discs including different diameters, said one disc being pulled into a main body of said disc player by a means for loading and placing a center of said one disc coincident to a center of a means for rotating the disc; and
    means for clamping the disc positioned by said means for positioning onto said means for rotating the disc,
    wherein said means for rotating the disc rotates said disc for taking out information from the disc,
    wherein said means for positioning and said means for clamping are provided separately from each other and are movable substantially vertically in synchronization as said one disc is pulled into the main body with respect to said means for rotating,
    wherein said means for positioning detects a diameter of said disc, and
    wherein said means for positioning comprises a disc stopper that positions said disc based on said detected diameter of said disc.

2. The disc player as claimed in claim 1, wherein said means for positioning positions said disc in a direction parallel to said means for rotating based on a diameter of said disc.

3. The disc player as claimed in claim 1, wherein said means for positioning aligns said disc with said means for rotating based on said diameter of said disc.

4. The disc player as claimed in claim 1, wherein said disc stopper positions said disc in a direction parallel to said means for rotating based on said diameter of said disc.

5. The disc player as claimed in claim 1, wherein said disc stopper aligns said disc with said means for rotating based on said diameter of said disc.

6. The disc player as claimed in claim 1, wherein said disc stopper positions said disc in a first position based on one predetermined disc diameter and positions said disc in a second position based on another predetermined disc diameter.

7. The disc player as claimed in claim 1, wherein said means for positioning and said means for clamping are substantially coplanar.

8. A disc player, comprising:
    a positioning unit for positioning a disc;
    a clamper unit for performing a clamp operation on the disc positioned by said positioning unit; and
    a drive unit that includes a pickup and a turntable, and rotates the disc clamped on the turntable by said damper unit to take out information from the disc by said pickup,
    wherein said positioning unit and said clamper unit are provided separately from each other and are movable substantially vertically in synchronization as the disc is pulled into the drive unit to said drive unit and are substantially coplanar,
    wherein said positioning unit is designed to position plural sizes of discs, and
    wherein said drive unit comprises a stationary drive unit which is not movable substantially vertically.

9. A disc player, comprising:
    a positioning unit for positioning a disc;
    a damper unit for performing a clamp operation on the disc positioned by said positioning unit; and
    a drive unit that includes a pickup and a turntable, and rotates the disc clamped on the turntable by said damper unit to take out information from the disc by said pickup,
    wherein said positioning unit and said clamper unit are provided separately from each other and are movable substantially vertically to said drive unit in synchronization as said disc is pulled into the disc player,
    wherein said positioning unit positions said disc in a direction parallel to said drive unit, and
    wherein said disc comprises one of a plurality of discs having one of same diameters and one of different diameters.

10. The disc player as claimed in claim 9, wherein said positioning unit positions one of said plurality of discs in a direction parallel to said drive unit based on a diameter of said one of said plurality of discs.

11. The disc player as claimed in claim 9, wherein said positioning unit is operable to position said plurality of discs in a direction parallel to said drive unit based on said different diameters of said plurality of discs.

12. The disc player as claimed in claim 9, wherein said positioning unit positions one of said plurality of discs in a direction parallel to said drive unit based on a diameter of said one of said plurality of discs such that said one of said plurality of discs is aligned with said drive unit for rotating by said drive unit.

13. The disc player as claimed in claim 9, wherein said drive unit further comprises left and right side walls integrally provided on both a right side and a left side of said drive unit, said left and right sidewalls being associated with a respective left and right cam plates, and wherein said respective left and right cam plates each comprise damper unit cam grooves and positioning unit cam grooves.

14. The disc player as claimed in claim 13, wherein said positioning unit comprises a step plate configured to associate with the positioning unit cam grooves.

15. The disc player as claimed in claim 14, wherein upward and downward movements of said step plate are configured to be synchronized with upward and downward movements of the clamper unit.

16. The disc player as claimed in claim 13, wherein said damper unit comprises a clamp plate configured to associate with the damper unit cam grooves.

17. The disc player as claimed in claim 16, wherein upward and downward movements of said clamp plate are configured to be synchronized with upward and downward movements of the positioning unit.

18. The disc player as claimed in claim 9, wherein, when said damper unit is moved forward in said disc player, said substantially vertical motion comprises a downward motion.

19. The disc player as claimed in claim 9, wherein, when said positioning unit is moved forward in said disc player, said substantially vertical motion comprises a downward motion.

20. The disc player as claimed in claim 9, where upward and downward motions of the positioning unit arc configured to be larger than upward and downward motions of the damper unit.

* * * * *